(12) United States Patent
Yan et al.

(10) Patent No.: US 11,900,925 B2
(45) Date of Patent: *Feb. 13, 2024

(54) OUTPUT METHOD AND ELECTRONIC DEVICE

(71) Applicant: Lenovo (Beijing) Co., Ltd., Beijing (CN)

(72) Inventors: Wenlin Yan, Beijing (CN); Shifeng Peng, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/735,297

(22) Filed: May 3, 2022

(65) Prior Publication Data

US 2022/0358911 A1 Nov. 10, 2022

Related U.S. Application Data

(63) Continuation of application No. 16/368,779, filed on Mar. 28, 2019, now Pat. No. 11,373,643.

(30) Foreign Application Priority Data

Mar. 30, 2018 (CN) .......................... 201810287318.0

(51) Int. Cl.
*G10L 15/22* (2006.01)
*G10L 15/18* (2013.01)
*G10L 15/08* (2006.01)

(52) U.S. Cl.
CPC .......... *G10L 15/1822* (2013.01); *G10L 15/22* (2013.01); *G10L 2015/088* (2013.01); *G10L 2015/223* (2013.01); *G10L 2015/225* (2013.01)

(58) Field of Classification Search
CPC ................. G10L 15/1822; G10L 15/22; G10L 2015/088; G10L 2015/223;
(Continued)

(56) References Cited

U.S. PATENT DOCUMENTS

| 7,257,537 B2 | 8/2007 | Ross et al. |
| 9,967,724 B1 | 5/2018 | Gan et al. |

(Continued)

FOREIGN PATENT DOCUMENTS

| CN | 103155510 A | 6/2013 |
| CN | 104965431 A | 10/2015 |

(Continued)

*Primary Examiner* — Abdelali Serrou
(74) *Attorney, Agent, or Firm* — ANOVA LAW GROUP, PLLC

(57) ABSTRACT

An output method includes obtaining voice information, determining whether the voice information is a voice request, in response to the voice information being the voice request, obtaining reply information for replying to the voice request and supplemental information, transmitting the reply information and the supplemental information to an output device for outputting the reply information and the supplemental information using different parameters, such that an output of the reply information is prioritized over an output of the supplemental information, and in response to receiving a predetermined operation, outputting the reply information and the supplemental information using different parameters, such that the output of the supplemental information is prioritized over the output of the reply information. The supplemental information is information that needs to be outputted in association with the reply information.

14 Claims, 6 Drawing Sheets

```
Obtain the voice information                                    S31

If the voice information is the voice request, obtain the reply information in
response to the voice request after the voice request is parsed and obtain a first audio
that matches environment information as the supplementary information, the          S32
supplemental information being the information that needs to be outputted in
association with the reply information.

Transmit the reply information and the supplementary information, such that the
associated supplementary information is outputted when the reply information is     S33
outputted
```

(58) Field of Classification Search
CPC . G10L 2015/225; G10L 19/008; G10L 25/90; G10L 19/00; G10L 19/20; G10L 13/00; G10L 15/02; G10L 15/20; G10L 15/32; G10L 17/26; G10L 2015/221; G10L 2015/227; G10L 2021/02166; G10L 21/0216; G10L 21/0364; G10L 21/043; G10L 21/057; G10L 25/78; G10L 25/84; G06F 40/35; G06F 3/167; G06F 3/0482; G06F 3/165; G06F 3/04842; G06F 3/017; G06F 3/04883; G06F 9/4812; G06F 16/44; G06F 3/04817; G06F 3/04847; G06F 3/0485; G06F 9/451; G06F 1/20; G06F 1/203; G06F 16/3334; G06F 16/957; G06F 17/00; G06F 16/907; G06F 21/31; G06F 21/44; G06F 3/011; G06F 3/048; G06F 3/162
See application file for complete search history.

(56) References Cited

U.S. PATENT DOCUMENTS

| | | | |
|---|---|---|---|
| 9,973,458 B2 | 5/2018 | Kim | |
| 10,095,470 B2 | 10/2018 | Lang et al. | |
| 10,499,146 B2 | 12/2019 | Lang et al. | |
| 10,516,637 B2* | 12/2019 | Ghotbi | G10L 15/22 |
| 10,593,322 B2 | 3/2020 | Roh et al. | |
| 10,666,901 B1 | 5/2020 | Zhang et al. | |
| 2005/0261907 A1 | 11/2005 | Smolenski et al. | |
| 2008/0015864 A1 | 1/2008 | Ross et al. | |
| 2011/0040396 A1 | 2/2011 | Kraemer et al. | |
| 2011/0144999 A1 | 6/2011 | Jang et al. | |
| 2013/0252569 A1 | 9/2013 | Choi | |
| 2014/0214425 A1 | 7/2014 | Bak et al. | |
| 2014/0277645 A1 | 9/2014 | Thirumale | |
| 2014/0358535 A1 | 12/2014 | Lee et al. | |
| 2015/0169284 A1 | 6/2015 | Quast et al. | |
| 2015/0169336 A1 | 6/2015 | Harper et al. | |
| 2015/0256685 A1* | 9/2015 | Amberden | 455/567 |
| 2016/0224315 A1 | 8/2016 | Zhang et al. | |
| 2017/0004828 A1 | 1/2017 | Lee et al. | |
| 2017/0025122 A1 | 1/2017 | Choi | |
| 2017/0059350 A1* | 3/2017 | Thirumale | |
| 2017/0093356 A1* | 3/2017 | Cudak | G06F 3/165 |
| 2017/0285915 A1 | 10/2017 | Napolitano et al. | |
| 2018/0074785 A1 | 3/2018 | Ohmura | |
| 2019/0020609 A1 | 1/2019 | Asukai | |
| 2019/0026056 A1 | 1/2019 | Wang et al. | |
| 2019/0026265 A1 | 1/2019 | Watanabe | |
| 2019/0027142 A1 | 1/2019 | Iwanami | |
| 2019/0050197 A1 | 2/2019 | Onohara et al. | |
| 2019/0051298 A1 | 2/2019 | Lee et al. | |
| 2019/0066680 A1 | 2/2019 | Woo et al. | |
| 2019/0082304 A1 | 3/2019 | Bestor et al. | |
| 2019/0138272 A1 | 5/2019 | Ahn | |
| 2019/0147859 A1 | 5/2019 | Zu et al. | |
| 2019/0164540 A1 | 5/2019 | Park | |
| 2019/0184567 A1 | 6/2019 | Hayashi | |
| 2019/0214002 A1 | 7/2019 | Park et al. | |
| 2019/0258318 A1 | 8/2019 | Qin et al. | |
| 2019/0271940 A1 | 9/2019 | Eom et al. | |
| 2019/0272831 A1 | 9/2019 | Kajarekar | |
| 2019/0287525 A1 | 9/2019 | Kim et al. | |
| 2019/0324925 A1 | 10/2019 | Toyoda et al. | |
| 2019/0332345 A1 | 10/2019 | Song et al. | |
| 2019/0344185 A1 | 11/2019 | Fargo | |
| 2019/0355365 A1 | 11/2019 | Kim et al. | |
| 2019/0378508 A1 | 12/2019 | Touyama | |
| 2019/0385599 A1 | 12/2019 | Zheng et al. | |
| 2020/0013402 A1 | 1/2020 | Kawano et al. | |
| 2020/0020334 A1 | 1/2020 | Kang et al. | |
| 2020/0037094 A1 | 1/2020 | Hosoda et al. | |
| 2020/0043491 A1 | 2/2020 | Lee et al. | |
| 2020/0051545 A1 | 2/2020 | Wase et al. | |
| 2020/0051554 A1 | 2/2020 | Kim et al. | |
| 2020/0074993 A1 | 3/2020 | Lee et al. | |
| 2020/0092519 A1 | 3/2020 | Shin et al. | |
| 2020/0098367 A1 | 3/2020 | Shin | |
| 2020/0111475 A1 | 4/2020 | Taki et al. | |
| 2020/0160863 A1 | 5/2020 | Lee et al. | |
| 2020/0193989 A1 | 6/2020 | Jeong | |
| 2020/0226671 A1 | 7/2020 | Shin et al. | |
| 2020/0244791 A1 | 7/2020 | Choi et al. | |

FOREIGN PATENT DOCUMENTS

| | | |
|---|---|---|
| CN | 105068147 A | 11/2015 |
| CN | 107203149 A | 9/2017 |
| CN | 107248937 A | 10/2017 |
| CN | 107437413 A | 12/2017 |
| CN | 107728497 A | 2/2018 |

* cited by examiner

OUTPUT METHOD AND ELECTRONIC DEVICE

CROSS-REFERENCE TO RELATED APPLICATIONS

This application is a continuation of application Ser. No. 16/368,779, filed on Mar. 28, 2019, which claims priority to Chinese Application No. 201810287318.0, filed on Mar. 30, 2018, the entire contents of both of which are incorporated herein by reference.

FIELD OF THE DISCLOSURE

The present disclosure relates to output technology and, more particularly, to an output method and an electronic device.

BACKGROUND

Currently, a user generally interacts with a smart speaker through voice. Often, no matter what information the user wants to obtain from the smart speaker, the user has to interact with the smart speaker through voice. Thus, obtaining even some basic daily information, for example, daily temperature, weather conditions, or the like, needs the user to perform the voice interaction.

SUMMARY

In accordance with the disclosure, there is provided an output method including obtaining voice information, determining whether the voice information is a voice request, in response to the voice information being the voice request, obtaining reply information for replying to the voice request, and supplemental information, and transmitting the reply information and the supplemental information to an output device for outputting. The supplemental information is information that needs to be outputted in association with the reply information.

Also in accordance with the disclosure, there is provided an electronic device including a processor and an output circuit. The processor is configured to obtain voice information, determine whether the voice information is a voice request, in response to the voice information being the voice request, obtain reply information for replying the voice request, and supplemental information, and transmit the reply information and the supplemental information to an output circuit for outputting. The supplemental information is information that needs to be outputted in association with the reply information. The output circuit is configured to output the reply information and the associated supplemental information.

BRIEF DESCRIPTION OF THE DRAWINGS

In order to provide a clearer illustration of embodiments of the present disclosure, brief descriptions of the drawings of the present disclosure are provided. The following drawings merely illustrate embodiments of the present disclosure. Other drawings may be obtained based on the disclosed drawings by those skilled in the art without creative efforts.

DETAILED DESCRIPTION

Hereinafter, embodiments of the present disclosure are described with reference to the accompanying drawings. It is apparent that the disclosed embodiments are merely some but not all of embodiments of the present disclosure. Other embodiments of the present disclosure may be obtained based on the embodiments disclosed herein by those skilled in the art without creative efforts, which are intended to be within the scope of the present disclosure.

Figure 1:
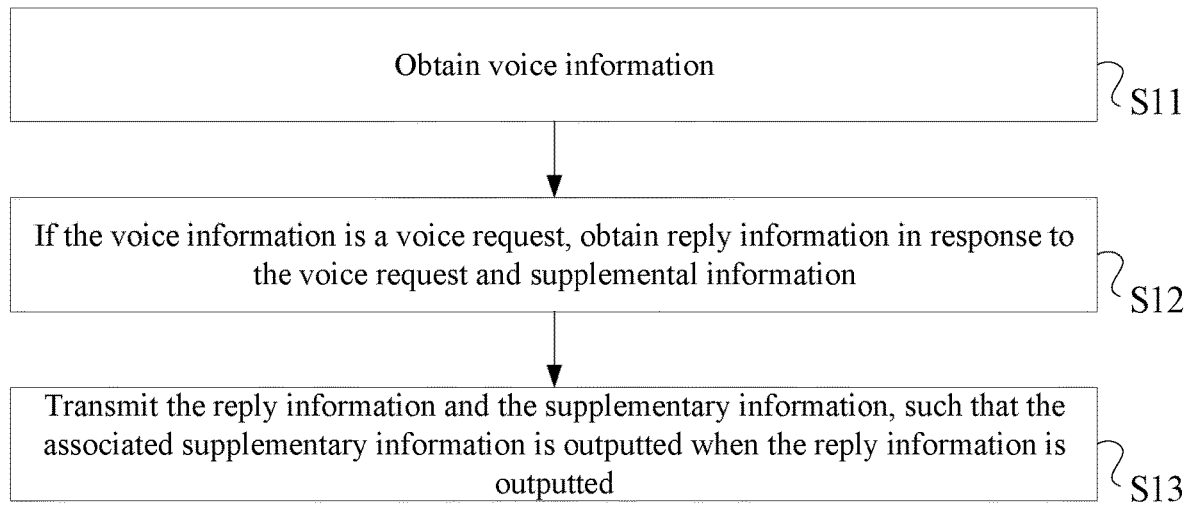
FIG. 1 is a flowchart of an output method according to the present disclosure.

FIG. 1 is a flowchart of an output method consistent with the present disclosure. As shown in FIG. 1, the output method may include the followings.

At S11, voice information is obtained. The voice information can include the voice information sent by a user, or the voice information outputted by other electronic devices. Here, the voice information can be obtained and the voice information that can be recognized may be parsed, but whether the voice information is sent by the user or outputted by the other electronic devices might not need to be identified.

At S12, if the voice information is a voice request, reply information in response to the voice request and supplemental information are obtained. The supplemental information refers to the information that needs to be outputted in association with the reply information.

If the obtained voice information is a voice command other than the voice request, an execution entity of the output method consistent with the present disclosure, such as a server or an electronic device, only needs to execute the voice command, and does not need to perform any response. For example, the voice information is "playing music". In this scenario, the execution entity only needs to play music, and does not need to implement any response operation. Herein, the voice command refers to a command to instruct the execution entity of the output method to implement an action but does not need any reply information from the execution entity of the output method. The voice request refers to a request that requires the execution entity of the output method to output the corresponding reply information.

If the obtained voice information is the voice request, such as a voice question, the execution entity needs to answer or respond to the voice question. For example, the voice information is "how many degrees is today's temperature?" In this scenario, the execution entity needs to obtain the reply information corresponding to the voice information, i.e., a reply for responding to the voice information, after parsing the voice information and clarifying the meaning thereof. For example, the reply information can be "today's temperature is 23 degrees."

The reply information can include voice and the reply information can be played by voice, or the reply information can include text and the reply information can be displayed through a display screen, or both.

In some embodiments, on the basis of obtaining the reply information in response to the voice request, the supplemental information may also need to be obtained. The supplemental information refers to that information that needs to be outputted in association with the reply information.

The supplemental information may be the information related to content of the reply information, or may be the information not related to the content of the reply information. However, after the supplemental information is obtained, the supplemental information needs to be associated with the reply information, such that when the reply information is outputted, the associated supplemental information can be outputted.

At S13, the reply information and the supplemental information are transmitted, such that the associated supplemental information is outputted when the reply information is outputted.

In some embodiments, when the reply information is outputted, the associated supplemental information can be simultaneously outputted, but the output of the reply information and the output of the supplemental information can be in a prioritized order. For example, the reply information can be a first priority, and the supplemental information can be outputted as a second priority.

For example, when a device implementing the output method includes a display apparatus and a speaker, the reply information can be outputted through the speaker, and the supplemental information can be outputted through the display device, such that the user can preferentially notice the reply information outputted through the speaker.

In some embodiments, the reply information can be outputted through the speaker, and after the reply information is outputted, the supplemental information can be then outputted through the speaker.

In some embodiments, the output method can be applied to a server. That is, the server can be the execution entity of the output method.

For example, the terminal electronic device can obtain the voice information, and send the voice information to the server. The server can receive the voice information, parse the voice information, and obtain an analysis result. The server can further obtain the reply information in response to the voice information, according to the analysis result, and transmit the reply information to the terminal electronic device via a network.

When the reply information in response to the voice information is obtained, according to the analysis result, and transmitted to the terminal electronic device via the network, the server can obtain the supplemental information and transmit the supplemental information to the terminal electronic device via the network.

In some embodiments, after the obtained supplemental information and the reply information are associated, the associated supplemental information and the reply information can be transmitted to the terminal electronic device together. The terminal electronic device can output, according to the associated supplemental information and the reply information. The associated supplemental information and the reply information can include an output rule of the supplemental information and the reply information, or the associated result can be the output rule.

In some embodiments, the reply information can be obtained by the server, and the reply information can be transmitted to the terminal electronic device via the network. The supplemental information can be stored inside the terminal electronic device. After the terminal electronic device obtains the reply information, the reply information and the supplemental information can be associated and then outputted.

In some other embodiments, the output method can be applied to the terminal electronic device. That is, the execution entity of the output method can be the terminal electronic device.

For example, the terminal electronic device can capture the voice information, parse the voice information, determine the analysis result, and obtain the reply information in response to the voice information, according to the analysis result. The terminal electronic device can obtain the supplemental information, and then associate the supplemental information with the reply information. The terminal electronic device can transmit the reply information and associated supplemental information to the speaker via an interface.

In some embodiments, the terminal electronic device can capture the voice information, and send the voice information to the server, and the server can obtain the reply information in response to the voice information after parsing the voice information. The terminal electronic device can associate the supplemental information with the reply information and transmitted the reply information and the associated supplemental information to the speaker via the interface. The supplemental information may be the supplemental information sent by the server or directly captured by the terminal electronic device, or may be the supplemental information stored in the terminal electronic device.

Consistent with the present disclosure, the output method can obtain the voice information. If the voice information is the voice request, the reply information in response to the voice request can be obtained, and the supplemental information can be obtained. The supplemental information refers to the information that needs to be outputted in association with the reply information. The reply information and the supplemental information can be transmitted, such that the associated supplemental information can be outputted when the reply information is outputted. When the voice request is received and the reply information in response to the voice request is obtained, the supplemental information outputted in association with the reply information can be obtained. Therefore, diversified feedback information can be realized. The problem that the feedback information in the conventional technologies is relatively simple and does not satisfy the diverse needs can be solved, and the user experience can be improved.

Figure 2:
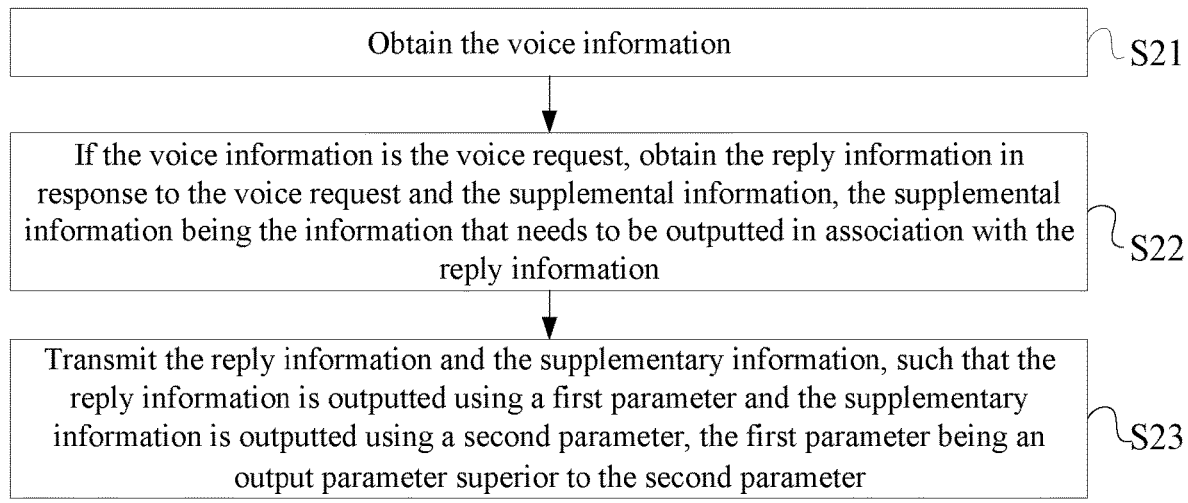
FIG. 2 is a flowchart of another output method according to the present disclosure.

FIG. 2 is a flowchart of an output method consistent with the present disclosure. As shown in FIG. 2, at S21, the voice information is obtained.

At S22, if the voice information is the voice request, the reply information in response to the voice request and the supplemental information are obtained. The supplemental information refers to the information that needs to be outputted in association with the reply information.

At S23, the reply information and the supplemental information are transmitted, such that the reply information is outputted using a first parameter, and the supplemental information is outputted using a second parameter. The first parameter is an output parameter superior to the second parameter. That is, the reply information using the first parameter is more likely to be noticed by the user than the supplemental information using the second parameter.

In some embodiments, in the process of transmitting the reply information and the supplemental information to an output circuit, the output rule that the reply information is outputted using the first parameter and the supplemental information is outputted using the second parameter can be simultaneously outputted to the output circuit. As such, the output circuit can receive the output rule while receiving the reply information and the supplemental information, such that the output circuit can directly output the reply information using the first parameter and output the supplemental information using the second parameter, according to the output rule.

In some embodiments, in the process of transmitting the reply information and the supplemental information to the output circuit, only the reply information and the supplemental information can be transmitted, and other data, such as the output rule, might not be transmitted. The output rule can be stored in the output circuit. Regardless of what are the reply information and the supplemental information received by the output circuit, the reply information and the supplemental information can be outputted according to a predetermined output rule stored inside the output circuit.

In some embodiments, the reply information and the supplemental information can be transmitted to the output circuit, such that the output circuit can output the reply information and the supplemental information after being mixed according to a first rule. The first rule can include outputting the reply information using the first parameter and outputting the supplemental information using the second parameter. The first parameter can be the output parameter superior to the second parameter.

In some embodiments, the reply information and the supplemental information after being mixed according to the first rule can be transmitted to the output circuit. The output circuit can receive the reply information and supplemental information after being mixed according to the first rule. In this scenario, the output circuit only needs to directly output the reply information and the supplemental information according to the first rule, i.e., output the reply information using the first parameter and output the supplemental information using the second parameter.

In some embodiments, the reply information and the supplemental information can be transmitted to the output circuit. The reply information and the supplemental information can be mixed by the output circuit, according to the first rule, after which the output circuit can output the reply information using the first parameter, and output the supplemental information using the second parameter.

The first parameter is the output parameter that is superior to the second parameter. That is, the reply information can be outputted using the output parameter superior to that of the supplemental information.

When the output circuit includes a display screen and a speaker or an output interface connected to the speaker, the reply information can be outputted via a voice signal, and the supplemental information can be outputted via an image signal.

When the output circuit only includes the display screen, the reply information can be outputted using a large font, and the supplemental information can be outputted using the small font, or, the reply information can be outputted using a font color with a higher brightness, and the supplemental information can be outputted using the font color with a lower brightness;

When the output circuit only includes the speaker or the output interface connected to the speaker, the reply information can be outputted using a first sound volume higher than a second sound volume, and the supplemental information can be outputted using the second sound volume, or, the reply information can be outputted using a first tone higher than a second tone, and the supplemental information can be outputted using the second tone.

In some embodiments, no matter whether the output circuit is the display screen, the speaker, or the output interface connected to the speaker, or the output circuit includes both the display screen and the speaker or the output interface connected to the speaker, the reply information can be outputted preferentially and the supplemental information can be outputted after the reply information has been outputted, or the reply information can be preferentially outputted and the supplemental information can be outputted between two adjacent outputs of the same reply information, or the reply information can be preferentially outputted and the supplemental information can be outputted between two adjacent outputs of different reply information.

Consistent with the present disclosure, the output method can obtain the voice information. If the voice information is the voice request, the reply information in response to the voice request can be obtained, and the supplemental information can be obtained. The supplemental information refers to the information that needs to be outputted in association with the reply information. The reply information and the supplemental information can be transmitted, such that the associated supplemental information can be outputted when the reply information is outputted. When the voice request is received and the reply information in response to the voice request is obtained, the supplemental information outputted in association with the reply information can be obtained. Therefore, diversified feedback information can be realized. The problem that the feedback information in the conventional technologies is relatively simple and does not satisfy the diverse needs can be solved, and the user experience can be improved.

Figure 3:
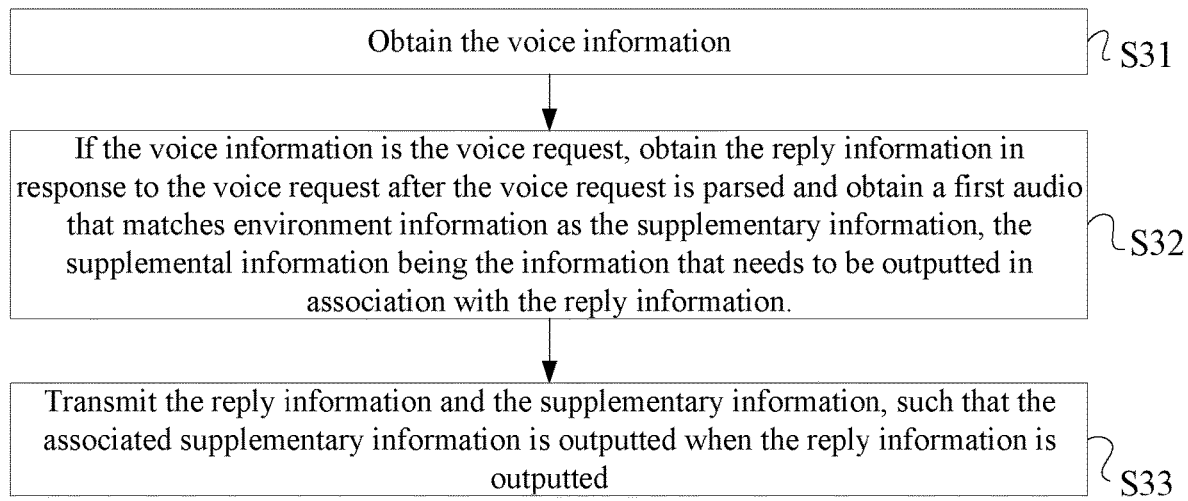
FIG. 3 is a flowchart of another output method according to the present disclosure.

FIG. 3 is a flowchart of an output method consistent with the present disclosure. As shown in FIG. 3, at S31, the voice information is obtained.

At S32, if the voice information is the voice request, the reply information in response to the voice request is obtained after the voice request is parsed, and a first audio that matches environment information is obtained as the supplemental information. The supplemental information refers to the information that needs to be outputted in association with the reply information.

For example, the supplemental information associated with the reply information can be the first audio that matches the environmental information. That is, the supplemental information can be used to indicate the environmental information through the first audio.

The first audio can include the audio indicating the environmental information. For example, if the environmental information is raining, the first audio can be a rain sound, and if the environmental information is windy, the first audio can be a wind sound. As such, after receiving the reply information and the supplemental information, the user can feel an immersive effect.

In some embodiments, different audios can be preset to represent different environmental states and a correspondence table can be established. After the environmental information is determined, the audio corresponding to the environmental information can be searched from the correspondence table. The audio can be the supplemental information. The user can know what is the environmental information through the output of the audio, without having to input the voice request to obtain the current environmental information.

In some embodiments, obtaining the voice information can include obtaining the voice information from an acquisition apparatus, and the environment information can include the environment information of an environment where the acquisition apparatus is located.

In some embodiments, the environmental information can include the environmental information of a designated location within a preset time period. The designated location can include the location of the server or the terminal electronic device which implements the output method, and can also include any other designated location.

In some embodiments, the environment information can include first environment information of a first designated location within the preset time period and second environment information of a second designated location within the preset time period, or the environment information can include third environment information of the designated location within a first preset time period and fourth environment information of the designated location within a second preset time period. That is, the environmental information can include the environmental information of different locations, or can include the environmental information of different time periods.

When the environment information includes the first environment information of the first designated location within the preset time period and the second environment information of the second designated location within the preset time period, abnormal environment information in the first environment information and the second environment information can be used as the output environment information, and the audio corresponding to the output environment information and the designated location can be obtained from a pre-stored audio library, and the audio can be determined as the first audio and can be outputted.

For example, the first designated location and the second designated location can be preset for monitoring the environmental status. If abnormal environment information occurring at the first designated location within the preset time period is detected, the abnormal environment information of the first designated location can be used as the environmental information and the audio matching the environmental information can be determined as the supplemental information. The environment information of the second designated location where no abnormality has occurred may not be outputted. For example, the weather that is not sunny can be set as the abnormal environment information. As another example, if a difference between the environmental information of a day or a time period and the environmental information of the same day or the same time period in a historical year exceeds a first threshold, the day or the time period can be set as the abnormal environmental information. As another example, if a change of the environmental information within the past five days or the past ten days exceeds a second threshold, the current day can be set as the abnormal environmental information.

When the environment information includes the third environment information of the designated location within the first preset time period and the fourth environment information of the designated location within the second preset time period, the abnormal environment information in the third environment information within the first preset time period and the fourth environment information within the second preset time period can be used as the output environment information, and the audio corresponding to the output environment information and the designated preset time period can be obtained from the pre-stored audio library, and the audio can be determined as the first audio and can be outputted.

For example, the designated location can be preset for monitoring the environmental status within the first preset time period and the second preset time period. If abnormal environment information occurring at the first designated location within the preset time period is detected, the abnormal environment information of the first designated location can be used as the environmental information and the audio matching the environmental information can be determined as the supplemental information. The environment information of the second designated location where no abnormality has occurred may not be outputted. For example, the weather that is not sunny can be set as the abnormal environment information. As another example, if a difference between the environmental information of a day or a time period and the environmental information of the same day or the same time period in a historical year exceeds a first threshold, the day or the time period can be set as the abnormal environmental information. As another example, if a change of the environmental information within the past five days or the past ten days exceeds a second threshold, the current day can be set as the abnormal environmental information.

In some embodiments, the reply information can exclude the environmental information or can include the environmental information.

When the reply information includes the environmental information, the voice request can be a request to obtain the environmental information and the environmental information in response to the voice request can be the reply information. In this scenario, the supplemental information refers to the information outputted in association with the reply information. After obtaining the reply information, the environmental information does not need to be obtained, and the supplemental information can be directly determined according to the reply information.

For example, the user's location is raining. If the user's voice request is "What is the current weather?" The reply information can be "It is raining and a little bit cold." In this scenario, the supplemental information can output the raining sound, e.g., the rhythm of the rain, or the sound of thunder, while outputting the reply information. That is, the rhythm of rain or the sound of thunder can be used as the background sound while outputting the voice or text display of "it is raining and a little bit cold." Adding the sound of the rain or thunder as the background sound can enable the user to clearly feel that it is raining and feel the immersive effect, when receiving the outputted reply information and supplemental information.

For example, the user's location is raining. If the user's voice request is "What is the current weather?" The reply information can be "It is raining and a little bit cold." In this scenario, the supplemental information can be adjusting playing parameters of a player, i.e., adjusting a tone or sound of the player when the reply information is sent. For example, the player who replied to the request can say "It is raining and a little bit cold" with the teeth tremble, allowing the user to feel the degree of cold after receiving the reply information and the supplemental information. As another example, the player who replied to the request can say "It is raining and a little bit cold" in the rain, such that after the user receives the reply information and the supplemental information, the user can clearly feel that the player is in the rain and the user can achieve the immersive effect.

When the reply information is irrelevant to the environment information, the voice request can include the request information that is irrelevant to the request to obtain the environment information. In this scenario, no matter what the obtained voice request is related to, the reply information in response to the voice request can be unrelated to the environment information. In some embodiments, when or after the reply information is obtained, or after the voice request is obtained, the environment information can be automatically obtained, and the audio matching the environment information can be determined as the first audio, and the first audio can be determined as the supplemental information that can be outputted in association with the reply information. Therefore, after the voice request irrelevant to the environment information is received, the reply information in response to the voice request can be outputted and the first audio matching the environment information can be also outputted as the supplemental information. As such, two answers can be obtained while raising only one question, in which the environmental information can be outputted as the supplemental information.

For example, the user's location is raining. The user's voice request is "What is the date today?" The reply information can be "Today is March 2nd," and the supplemental information can include the rhythm of the rain. Therefore, the reply information and the supplemental information that the user hears can be "Today is March 2nd" with the rhythm of the rain as the background sound, thereby enabling the user to clarify the current environmental information while obtaining the answer he wants.

In some embodiments, an output mode of the reply information can be determined according to the supplemental information.

If the supplemental information is the environmental information, the output mode can be that different environmental information correspond to different reply information.

For example, if the environmental information indicates a sunny day, the reply information can be outputted using a cheerful tone, and if the environmental information indicates a rainy day, the reply information can be outputted using a dull tone. As another example, if the environmental information indicates the sunny day, a female voice can be used to output the reply information, and if the environmental information indicates the rainy day, a male voice can be used to output the reply information. As another example, if the environmental information indicates the sunny day, the reply information can be outputted using the white font and black background, and if the environmental information indicates the rainy day, the reply information can be outputted using the black font and white background, or if the environmental information indicates that the sunny day, the reply information can be outputted using colored font, and if the environment information indicates the rainy day, the reply information can be outputted using the black and white font.

The above examples are merely exemplary illustration, and the output mode can include other forms, which are not intended to be limited herein.

At S33, the reply information and the supplemental information are transmitted, such that the associated supplemental information is outputted when the reply information is outputted.

Consistent with the present disclosure, the output method can obtain the voice information. If the voice information is the voice request, the reply information in response to the voice request can be obtained, and the supplemental information can be obtained. The supplemental information refers to the information that needs to be outputted in association with the reply information. The reply information and the supplemental information can be transmitted, such that the associated supplemental information can be outputted when the reply information is outputted. When the voice request is received and the reply information in response to the voice request is obtained, the supplemental information outputted in association with the reply information can be obtained. Therefore, diversified feedback information can be realized. The problem that the feedback information in the conventional technologies is relatively simple and does not satisfy the diverse needs can be solved, and the user experience can be improved.

Figure 4:
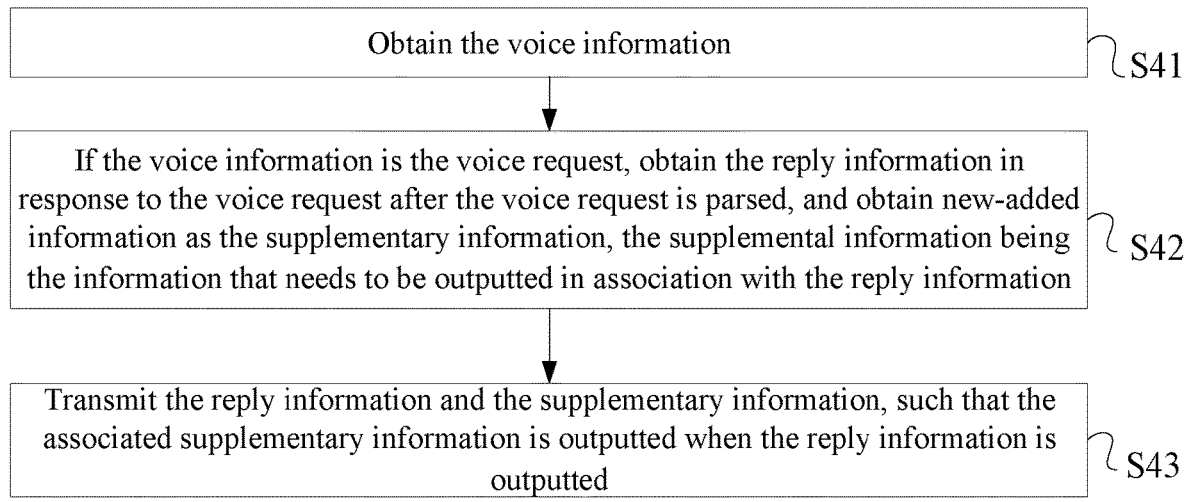
FIG. 4 is a flowchart of another output method according to the present disclosure.

FIG. 4 is a flowchart of an output method consistent with the present disclosure. As shown in FIG. 4, at S41, the voice information is obtained.

At S42, if the voice information is the voice request, the reply information in response to the voice request is obtained after the voice request is parsed, and newly-added information is obtained as the supplemental information. The supplemental information refers to the information that needs to be outputted in association with the reply information. The newly-added information refers to information that is unrelated to the reply information.

No matter what is the obtained voice request, the supplemental information associated with the reply information can be the newly-added information and can be not related to the content of the reply information.

The newly-added information can include other information, such as news, some important decisions, or the like, that is pushed by certain specified applications.

After the newly-added information is obtained, whether an important level of the newly-added information satisfies a predetermined level can be determined. If satisfies, the newly-added information can be determined as the supplemental information. If not, the newly-added information can be determined not as the supplement information. The supplement information can be outputted in association with the reply information. The reply information can be outputted using the first parameter, and the supplemental information can be outputted using the second parameter. The first parameter is the output parameter superior to the second parameter. Therefore, when some important events instead of major events happened, when the user sends the voice request, the important event can be outputted to the user while outputting the reply information in response to the voice request, such that the user can know the important event and a question can be raised for the event when the user is interested in the important event, thereby avoiding a situation where the user is unaware of the event and cannot raise the question.

If no newly-added information has the important level that satisfies the predetermined level, and thus can be used as the supplemental information, and the environmental information can be used as the supplemental information and outputted in association with the reply information.

If no less than two pieces of newly-added information have the important information levels that satisfy the predetermined level, the newly-added information having a highest important level can be selected as the supplemental information, or the no less than two newly-added information can be all determined as the supplemental information. When being outputted in association with the reply information, the no less than two newly-added information can be outputted in turn, such that the no less than two newly-added information can be known to the user as the supplemental information.

In some embodiments, the reply information can be outputted using the first parameter, and the newly-added information can be outputted using the second parameter. The first parameter can be the output parameter superior to the second parameter. When the predetermined condition is detected to be satisfied, the reply information can be outputted using the third parameter, and the newly-added information can be outputted using the fourth parameter. The fourth parameter is superior to the third parameter.

A predetermined operation can be a gesture or voice command. The predetermined operation can also be that after the newly-added information is received, the important level of the newly-added information can be pre-judged, and if the important level reaches the predetermined level, the reply information can be outputted using the third parameter, and the newly-added information can be outputted using the fourth parameter superior to the third parameter. As such, the goal of giving priority to the major events can be achieved.

When the predetermined operation is the gesture or voice command, the user can directly judge that the reply information is not as important as the newly-added information, such that the newly-added information can be outputted superiorly.

For example, when the voice request is sent by the user and the reply information in response to the voice request is obtained, there is the major event that needs to be outputted in the process of outputting the reply information. For example, the user's voice request is "What is the weather like today?" The reply information can be "Today is a bit cloudy and the temperature is relatively low." While outputting the reply information, the device received the major event, such as "Mr. Hawking died on Mar. 14th." At the same time, the predetermined operation, such as the gesture or voice command of the user, is received, the reply information can be outputted using the third parameter, and the newly-added information can be outputted using the fourth parameter superior to the third parameter. For example, the newly-added information of "The Death of Hawking on March 14th" can be outputted first, and "It's a bit cloudy today and the temperature is relatively low" can be then outputted. Therefore, when the major event occurs, the newly-added important event can be outputted with the output parameter superior to the reply information, and the priority output of the high priority content can be realized.

At S43, the reply information and the supplemental information are transmitted, such that the associated supplemental information is outputted when the reply information is outputted.

Consistent with the present disclosure, the output method can obtain the voice information. If the voice information is the voice request, the reply information in response to the voice request can be obtained, and the supplemental information can be obtained. The supplemental information refers to the information that needs to be outputted in association with the reply information. The reply information and the supplemental information can be transmitted, such that the associated supplemental information can be outputted when the reply information is outputted. When the voice request is received and the reply information in response to the voice request is obtained, the supplemental information outputted in association with the reply information can be obtained. Therefore, diversified feedback information can be realized. The problem that the feedback information in the conventional technologies is relatively simple and does not satisfy the diverse needs can be solved, and the user experience can be improved.

Figure 5:
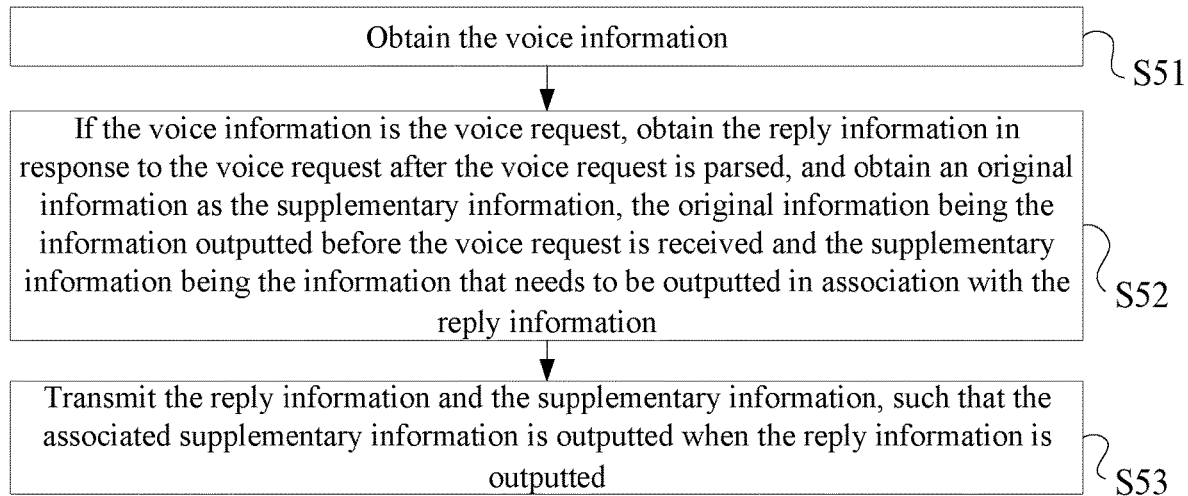
FIG. 5 is a flowchart of another output method according to the present disclosure.

FIG. 5 is a flowchart of an output method consistent with the present disclosure. As shown in FIG. 5, at S51, the voice information is obtained.

At S52, if the voice information is the voice request, the reply information in response to the voice request is obtained after the voice request is parsed, and an original information is obtained as the supplemental information. The original information refers to the information outputted before the voice request is received, and the supplemental information refers to the information that needs to be outputted in association with the reply information.

In some embodiments, the server or the electronic device keeps outputting or is continuously outputting the information before receiving the voice request. When the voice request is received, the output can be interrupted. In order to maintain the continuity of the original output, the original output can be used as the supplemental information, and can be outputted in association with the reply information. Therefore, not only the response of the voice request, but also the continuity of the original output can be guaranteed.

In some embodiments, the original information can be used as the supplemental information only if the original information is determined to be a first type.

The first type can include at least one of the followings: information not including content, information from a predetermined application or a predetermined content source, or information having the number of playbacks that exceeds a threshold.

The original information can include content information and/or background information. The content information can include the information having substantial content, e.g., language, text, or the like, and the background information can include pure music, information without substantial content, e.g., language, text, or the like.

When the original information is the information having no content and only having the background information, such as pure music, the original information can be used as the supplemental information. The playback of the original information cannot be interrupted, but only the playback parameters might be adjusted. When the original information is the language information, such as a storytelling, the original information cannot be used as the supplemental information. That is, the playback of the original information can be interrupted to avoid missing the content of the storytelling, causing the problem that the content cannot be connected.

The original information can include the information from the predetermined application or the predetermined content source, such as, KuGou music. When the original information is the information from KuGou music, the original information can be used as the supplemental information, and the playback of the original information can be not interrupted, but only the playback parameters might be adjusted. When the original information is the information from an application other than KuGuo music, such as the original information obtained from an audio novel, the original information cannot be used as the supplemental information. That is, the playback of the original information can be interrupted to avoid missing the content of the storytelling, causing the problem that the content cannot be connected.

If the number of playbacks exceeds the threshold, i.e., the playback has been performed multiple times, there is no need to worry about that the content might be missed by using the information as the supplemental information. For example, the original information is a certain audio novel. The audio novel has been playbacked many times by the same device, i.e., the user has listened too many times. In this scenario, there is no need to worry about that the content of the novel might be missed, causing the problem that the content cannot be connected. Therefore, the original information can be used as the supplemental information without interrupting the playback of the original information, but only adjusting the playback parameters.

No matter the original information belongs to which one of the several categories of the first type, the original information can be directly outputted as the supplemental information without interrupting the original information. As such, after the completion of the output of the reply information, a command for continue the playback is not needed to realize a program of continuing playback of the suspended original information, thereby saving the program and improving the user experience.

For example, the server or the electronic device is playing back a song or a storytelling before receiving the voice request. In this scenario, after obtaining the reply information, the song or storytelling originally outputted can be used as the supplemental information, the song or storytelling originally outputted can be not interrupted while responding to the voice request.

As another example, the server or the electronic device is playing back a song or storytelling before receiving the voice request. However, the first type includes news, and songs or storytelling that are not classified as news. After the reply information is obtained, the song or storytelling originally outputted cannot be used as the supplemental information.

In this scenario, only the reply information can be outputted, or the audio corresponding to the environment information can be determined as the supplemental information. The supplemental information can be outputted in association with the reply information, such that although the original output cannot be outputted without interrupting while the reply information is outputted, but the output of environmental information can be performed.

At S53, the reply information and the supplemental information are transmitted, such that the associated supplemental information is outputted when the reply information is outputted.

Consistent with the present disclosure, the output method can obtain the voice information. If the voice information is the voice request, the reply information in response to the voice request can be obtained, and the supplemental information can be obtained. The supplemental information refers to the information that needs to be outputted in association with the reply information. The reply information and the supplemental information can be transmitted, such that the associated supplemental information can be outputted when the reply information is outputted. When the voice request is received and the reply information in response to the voice request is obtained, the supplemental information outputted in association with the reply information can be obtained. Therefore, diversified feedback information can be realized. The problem that the feedback information in the conventional technologies is relatively simple and does not satisfy the diverse needs can be solved, and the user experience can be improved.

Figure 6:
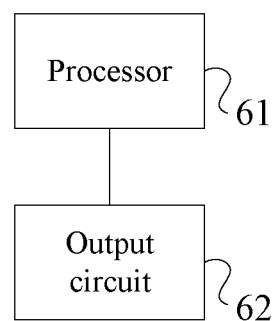
FIG. 6 is a schematic structural diagram of an electronic device according to the present disclosure.

FIG. 6 is a schematic structural diagram of an electronic device consistent with the present disclosure. As shown in FIG. 6, the electronic device includes a processor 61 and an output circuit 62. The processor 61 may be a Central Processing Unit (CPU) or another form of processing unit with data processing capabilities and/or instruction execution capabilities, including, but not limited to, Microcontroller (MCU), or Field Programmable Gate Array (FPGA), or the like. The output circuit 62 can be coupled to the processor 61 for outputting information.

The processor 61 can be configured to obtain the voice information, and if the voice information is the voice request, obtain the reply information in response to the voice request and the supplemental information. The supplemental information refers to the information that needs to be outputted in association with the reply information. The processor 61 can be further configured to transmit the reply information and the supplemental information, such that the associated supplemental information can be outputted when the reply information is outputted.

The voice information can include the voice information sent by the user, or the voice information outputted by other electronic devices. Here, the voice information can be obtained and the voice information that can be recognized might be parsed, but whether the voice information is sent by the user or outputted by the other electronic devices does not need to be identified.

If the obtained voice information is the voice command other than the voice request, the electronic device only needs to execute the voice command, and does not need to perform any response. For example, the voice information is "playing music". In this scenario, the electronic device only needs to play music, and does not need to implement any response operation.

If the obtained voice information is the voice request, such as the voice question, the electronic device needs to answer or respond to the voice question. For example, the voice information is "how many degrees is today's temperature?" In this scenario, the electronic device needs to obtain the reply information corresponding to the voice information, i.e., the reply for responding to the voice information, after parsing the voice information and clarifying the meaning thereof. For example, the reply information can be "today's temperature is 23 degrees."

The reply information can include voice and the reply information can be played by voice, or the reply information can include text and the reply information can be displayed through a display screen, or both In some embodiments, on the basis of obtaining the reply information in response to the voice request, the supplemental information may also need to be obtained. The supplemental information refers to that information that needs to be outputted in association with the reply information.

The supplemental information may be the information related to content of the reply information, or may be the information not related to the content of the reply information. However, after the supplemental information is obtained, the supplemental information needs to be associated with the reply information, such that when the reply information is output, the associated supplemental information can be outputted.

In some embodiments, when the reply information is outputted, the associated supplemental information can be simultaneously outputted, but the output of the reply information and the output of the supplemental information can be in a prioritized order. For example, the reply information can be the first priority, and the supplemental information can be outputted as the second priority.

For example, when the electronic device includes a display apparatus and a speaker, the reply information can be outputted through the speaker, and the supplemental information can be outputted through the display device, such that the user can preferentially notice the reply information outputted through the speaker.

In some embodiments, the reply information can be outputted through the speaker, and after the reply information is outputted, the supplemental information can be then outputted through the speaker.

In some embodiments, in addition to the terminal electronic device, the electronic device consistent with the present disclosure can also be the server.

For example, the terminal electronic device can obtain the voice information, and send the voice information to the server. The server can receive the voice information, parse the voice information, and obtain an analysis result. The server can further obtain the reply information in response to the voice information, according to the analysis result, and transmit the reply information to the terminal electronic device via a network.

When the reply information in response to the voice information is obtained, according to the analysis result, and transmitted to the terminal electronic device via the network, the server can obtain the supplemental information and transmit the supplemental information to the terminal electronic device via the network.

In some embodiments, after the obtained supplemental information and the reply information are associated, the associated supplemental information and the reply information can be transmitted to the terminal electronic device together. The terminal electronic device can output, according to the associated supplemental information and the reply information. The associated supplemental information and the reply information can include an output rule of the supplemental information and the reply information, or the associated result can be the output rule.

In some embodiments, the reply information can be obtained by the server, and the reply information can be transmitted to the terminal electronic device via the network. The supplemental information can be stored inside the terminal electronic device. After the terminal electronic device obtains the reply information, the reply information and the supplemental information can be associated and then outputted.

In some embodiments, the reply information and the supplemental information can be transmitted, such that the reply information can be outputted using the first parameter, and the supplemental information can be outputted using the second parameter. The first parameter is an output parameter superior to the second parameter.

In some embodiments, in the process of transmitting the reply information and the supplemental information to the output circuit 62, the output rule that the reply information is outputted using the first parameter and the supplemental information is outputted using the second parameter can be simultaneously outputted to the output circuit. As such, the output circuit 62 can receive the output rule while receiving the reply information and the supplemental information, such that the output circuit 62 can directly output the reply information using the first parameter and output the supplemental information using the second parameter, according to the output rule.

In some embodiments, in the process of transmitting the reply information and the supplemental information to the output circuit 62, only the reply information and the supplemental information can be transmitted, and other data, such as the output rule, might be not transmitted. The output rule can be stored in the output circuit 62. Regardless of what are the reply information and the supplemental information received by the output circuit 62, the reply information and the supplemental information can be outputted according to the predetermined output rule stored inside the output circuit 62.

In some embodiments, the reply information and the supplemental information can be transmitted to the output circuit 62, such that the output circuit 62 can output the reply information and the supplemental information after being mixed according to the first rule. The first rule can include outputting the reply information using the first parameter and outputting the supplemental information using the second parameter. The first parameter can be the output parameter superior to the second parameter.

In some embodiments, the reply information and the supplemental information after being mixed according to the first rule can be transmitted to the output circuit 62. The output circuit 62 can receive the reply information and supplemental information after being mixed according to the first rule. In this scenario, the output circuit 62 only needs to directly output the reply information and the supplemental information according to the first rule, i.e., output the reply information using the first parameter and output the supplemental information using the second parameter.

In some embodiments, the reply information and the supplemental information can be transmitted to the output circuit 62. The reply information and the supplemental information can be mixed by the output circuit 62, according to the first rule, after which the output circuit 62 can output the reply information using the first parameter, and output the supplemental information using the second parameter.

The first parameter is the output parameter that is superior to the second parameter. That is, the reply information can be outputted using the output parameter superior to that of the supplemental information.

When the output circuit 62 includes the display screen and the speaker or the output interface connected to the speaker, the reply information can be outputted via the voice signal, and the supplemental information can be outputted via the image signal.

When the output circuit only includes the display screen, the reply information can be outputted using a large font, and the supplemental information can be outputted using the small font, or, the reply information can be outputted using a font color with a higher brightness, and the supplemental information can be outputted using the font color with a lower brightness;

When the output circuit only includes the speaker or the output interface connected to the speaker, the reply information can be outputted using a first sound volume higher than a second sound volume, and the supplemental information can be outputted using the second sound volume, or, the reply information can be outputted using a first tone higher than a second tone, and the supplemental information can be outputted using the second tone.

In some embodiments, no matter whether the output circuit is the display screen, the speaker, or the output interface connected to the speaker, or the output circuit includes both the display screen and the speaker or the output interface connected to the speaker, the reply information can be outputted preferentially and the supplemental information can be outputted after the reply information has been outputted, or the reply information can be preferentially outputted and the supplemental information can be outputted between two adjacent outputs of the same reply information, or the reply information can be preferentially outputted and the supplemental information can be outputted between two adjacent outputs of different reply information.

In some embodiments, the reply information in response to the voice request can be obtained after the voice request is parsed, and the first audio that matches environment information that obtained as the supplemental information. The supplemental information refers to the information that needs to be outputted in association with the reply information.

For example, the supplemental information associated with the reply information can be the first audio that matches the environmental information. That is, the supplemental information can be used to indicate the environmental information through the first audio.

The first audio can include the audio indicating the environmental information. For example, if the environmental information is raining, the first audio can be the rain sound, and if the environmental information is windy, the first audio can be the wind sound. As such, after receiving the reply information and the supplemental information, the user can feel the immersive effect.

In some embodiments, different audios can be preset to represent different environmental states and a correspondence table can be established. After the environmental information is determined, the audio corresponding to the environmental information can be searched from the correspondence table. The audio can be the supplemental information. The user can know what is the environmental information through the output of the audio, without having to input the voice request to obtain the current environmental information.

In some embodiments, obtaining the voice information can include obtaining the voice information from the acquisition apparatus, and the environment information can include the environment information of the environment where the acquisition apparatus is located.

In some embodiments, the environmental information can include the environmental information of a designated location within a preset time period. The designated location can include the location of the server or the terminal electronic device which implements the output method, and can also include any other designated location.

In some embodiments, the environment information can include first environment information of a first designated location within the preset time period and second environment information of a second designated location within the preset time period, or the environment information can include third environment information of the designated location within a first preset time period and fourth environment information of the designated location within a second preset time period. That is, the environmental information can include the environmental information of different locations, or can include the environmental information of different time periods.

When the environment information includes the first environment information of the first designated location within the preset time period and the second environment information of the second designated location within the preset time period, abnormal environment information in the first environment information and the second environment information can be used as the output environment information, and the audio corresponding to the output environment information and the designated location can be obtained from a pre-stored audio library, and the audio can be determined as the first audio and can be outputted.

For example, the first designated location and the second designated location can be preset for monitoring the environmental status. If abnormal environment information occurring at the first designated location within the preset time period is detected, the abnormal environment information of the first designated location can be used as the environmental information and the audio matching the environmental information can be determined as the supplemental information. The environment information of the second designated location where no abnormality has occurred may not be outputted. For example, the weather that is not sunny can be set as the abnormal environment information. As another example, if a difference between the environmental information of a day or a time period and the environmental information of the same day or the same time period in a historical year exceeds a first threshold, the day or the time period can be set as the abnormal environmental information. As another example, if a change of the environmental information within the past five days or the past ten days exceeds a second threshold, the current day can be set as the abnormal environmental information.

When the environment information includes the third environment information of the designated location within the first preset time period and the fourth environment information of the designated location within the second preset time period, the abnormal environment information in the third environment information within the first preset time period and the fourth environment information within the second preset time period can be used as the output environment information. The audio corresponding to the output environment information and the designated preset time period can be obtained from the pre-stored audio library, and the audio can be determined as the first audio and can be outputted.

For example, the designated location can be preset for monitoring the environmental status within the first preset time period and the second preset time period. If abnormal environment information occurring at the first designated location within the preset time period is detected, the abnormal environment information of the first designated location can be used as the environmental information and the audio matching the environmental information can be determined as the supplemental information. The environment information of the second designated location where no abnormality has occurred may not be outputted. For example, the weather that is not sunny can be set as the abnormal environment information. As another example, if a difference between the environmental information of a day or a time period and the environmental information of the same day or the same time period in a historical year exceeds a first threshold, the day or the time period can be set as the abnormal environmental information. As another example, if a change of the environmental information within the past five days or the past ten days exceeds a second threshold, the current day can be set as the abnormal environmental information.

In some embodiments, the reply information can be unrelated to the environmental information or can include the environmental information.

When the reply information includes the environmental information, the voice request can be a request to obtain the environmental information and the environmental information in response to the voice request can be the reply information. In this scenario, the supplemental information refers to the information outputted in association with the reply information. After obtaining the reply information, the environmental information does not need to be obtained, and the supplemental information can be directly determined according to the reply information.

For example, the user's location is raining. If the user's voice request is "What is the current weather?" The reply information can be "It is raining and a little bit cold." In this scenario, the supplemental information can output the raining sound, e.g., the rhythm of the rain, or the sound of thunder, while outputting the reply information. That is, the rhythm of rain or the sound of thunder can be used as the background sound while outputting the voice or text display of "it is raining and a little bit cold." Adding the sound of the rain or thunder as the background sound can enable the user to clearly feel that it is raining and feel the immersive effect, when receiving the outputted reply information and supplemental information.

For example, the user's location is raining. If the user's voice request is "What is the current weather?" The reply information can be "It is raining and a little bit cold." In this scenario, the supplemental information can be adjusting playing parameters of a player, i.e., adjusting a tone or sound of the player when the reply information is sent. For example, the player who replied to the request can say "It is raining and a little bit cold" with the teeth tremble, allowing the user to feel the degree of cold after receiving the reply information and the supplemental information. As another example, the player who replied to the request can say "It is raining and a little bit cold" in the rain, such that after the user receives the reply information and the supplemental information, the user can clearly feel that the player is in the rain and the user can achieve the immersive effect.

When the reply information is irrelevant to the environment information, the voice request can include the request information that is irrelevant to the request to obtain the environment information. In this scenario, no matter what the obtained voice request is related to, the reply information in response to the voice request can be unrelated to the environment information. In some embodiments, when or after the reply information is obtained, or after the voice request is obtained, the environment information can be automatically obtained, and the audio matching the environment information can be determined as the first audio, and the first audio can be determined as the supplemental information that can be outputted in association with the reply information. Therefore, after the voice request irrelevant to the environment information is received, the reply information in response to the voice request can be outputted and the first audio matching the environment information can be also outputted as the supplemental information. As such, two answers can be obtained while raising only one question, in which the environmental information can be outputted as the supplemental information.

For example, the user's location is raining. The user's voice request is "What is the date today?" The reply information can be "Today is March 2nd," and the supplemental information can include the rhythm of the rain. Therefore, the reply information and the supplemental information that the user hears can be "Today is March 2nd" with the rhythm of the rain as the background sound, thereby enabling the user to clarify the current environmental information while obtaining the answer he wants.

In some embodiments, the output mode of the reply information can be determined according to the supplemental information.

If the supplemental information is the environmental information, the output mode can be that different environmental information correspond to different reply information.

For example, if the environmental information indicates a sunny day, the reply information can be outputted using a cheerful tone, and if the environmental information indicates a rainy day, the reply information can be outputted using a dull tone. As another example, if the environmental information indicates the sunny day, a female voice can be used to output the reply information, and if the environmental information indicates the rainy day, a male voice can be used to output the reply information. As another example, if the environmental information indicates the sunny day, the reply information can be outputted using the white font and black background, and if the environmental information indicates the rainy day, the reply information can be outputted using the black font and white background, or if the environmental information indicates that the sunny day, the reply information can be outputted using colored font, and if the environment information indicates the rainy day, the reply information can be outputted using the black and white font.

The above examples are merely exemplary illustration, and the output mode can include other forms, which are not intended to be limited herein.

In some embodiments, the reply information in response to the voice request can be obtained after the voice request is parsed, and the newly-added information can be obtained as the supplemental information. The supplemental information refers to the information that needs to be outputted in association with the reply information.

No matter what is the obtained voice request, the supplemental information associated with the reply information can be the newly-added information and can be not related with the content of the reply information.

The newly-added information can include other information, such as the news, some important decisions, or the like, that is pushed by the certain specified applications.

After the newly-added information is obtained, whether the important level of the newly-added information satisfies a predetermined level can be determined. If satisfies, the newly-added information can be determined as the supplemental information. If not, the newly-added information can be determined not as the supplement information. The supplement information can be outputted in association with the reply information. The reply information can be outputted using the first parameter, and the supplemental information can be outputted using the second parameter. The first parameter is the output parameter superior to the second parameter. Therefore, when some important events instead of major events happened, when the user sends the voice request, the important event can be outputted to the user while outputting the reply information in response to the voice request, such that the user can know the important event and a question can be raised for the event when the user is interested in the important event, thereby avoiding a situation where the user is unaware of the event and cannot raise the question.

If no newly-added information has the important level that satisfies the predetermined level, and thus can be used as the supplemental information, and the environmental information can be used as the supplemental information and outputted in association with the reply information.

If no less than two pieces of newly-added information have the important information levels that satisfy the predetermined level, the newly-added information having a highest important level can be selected as the supplemental information, or the no less than two newly-added information can be all determined as the supplemental information. When being outputted in association with the reply information, the no less than two newly-added information can be outputted in turn, such that the no less than two newly-added information can be known to the user as the supplemental information.

In some embodiments, the reply information can be outputted using the first parameter, and the newly-added information can be outputted using the second parameter. The first parameter can be the output parameter superior to the second parameter. When the predetermined condition is detected to be satisfied, the reply information can be outputted using the third parameter, and the newly-added information can be outputted using the fourth parameter. The fourth parameter is superior to the third parameter.

A predetermined operation can be the gesture or voice command. The predetermined operation can also be that after the newly-added information is received, the important level of the newly-added information can be pre-judged, and if the important level reaches the predetermined level, the reply information can be outputted using the third parameter, and the newly-added information can be outputted using the fourth parameter superior to the third parameter. As such, the goal of giving priority to the major events can be achieved.

When the predetermined operation is the gesture or voice command, the user can directly judge that the reply information is not as important as the newly-added information, such that the newly-added information can be outputted superiorly.

For example, when the voice request is sent by the user and the reply information in response to the voice request is obtained, there is the major event that needs to be outputted in the process of outputting the reply information. For example, the user's voice request is "What is the weather like today?" The reply information can be "Today is a bit cloudy and the temperature is relatively low." While outputting the reply information, the device received the major event, such as "Mr. Hawking died on Mar. 14th." At the same time, the predetermined operation, such as the gesture or voice command of the user, is received, the reply information can be outputted using the third parameter, and the newly-added information can be outputted using the fourth parameter superior to the third parameter. For example, the newly-added information of "The Death of Hawking on March 14th" can be outputted first, and "It's a bit cloudy today and the temperature is relatively low" can be then outputted. Therefore, when the major event occurs, the newly-added important event can be outputted with the output parameter superior to the reply information, and the priority output of the high priority content can be realized.

In some embodiments, the reply information in response to the voice request can be obtained after the voice request is parsed, and the original information can be obtained as the supplemental information. The original information refers to the information outputted before the voice request is received, and the supplemental information refers to the information that needs to be outputted in association with the reply information.

In some embodiments, the server or the electronic device keeps outputting or is continuously outputting the information before receiving the voice request. When the voice request is received, the output can be interrupted. In order to maintain the continuity of the original output, the original output can be used as the supplemental information, and can be outputted in association with the reply information. Therefore, not only the response of the voice request, but also the continuity of the original output can be guaranteed.

In some embodiments, the original information can be used as the supplemental information only if the original information is determined to be the first type.

The first type can include at least one of the followings: information not including content, information from the predetermined application or the predetermined content source, or information having the number of playbacks that exceeds the threshold.

The original information can include content information and/or background information. The content information can include the information having substantial content, e.g., language, text, or the like, and the background information can include pure music, information without substantial content, e.g., language, text, or the like.

When the original information is the information having no content and only having the background information, such as pure music, the original information can be used as the supplemental information. The playback of the original information cannot be interrupted, but only the playback parameters might be adjusted. When the original information is the language information, such as a storytelling, the original information cannot be used as the supplemental information. That is, the playback of the original information can be interrupted to avoid missing the content of the storytelling, causing the problem that the content cannot be connected.

The original information can include the information from the predetermined application or the predetermined content source, such as, KuGou music. When the original information is the information from KuGou music, the original information can be used as the supplemental information, and the playback of the original information can be not interrupted, but only the playback parameters might be adjusted. When the original information is the information from an application other than KuGuo music, such as the original information obtained from an audio novel, the original information cannot be used as the supplemental information. That is, the playback of the original information can be interrupted to avoid missing the content of the storytelling, causing the problem that the content cannot be connected.

If the number of playbacks exceeds the threshold, i.e., the playback has been performed multiple times, there is no need to worry about that the content might be missed by using the information as the supplemental information. For example, the original information is a certain audio novel. The audio novel has been playbacked many times by the same device, i.e., the user has listened too many times. In this scenario, there is no need to worry about that the content of the novel might be missed, causing the problem that the content cannot be connected. Therefore, the original information can be used as the supplemental information without interrupting the playback of the original information, but only adjusting the playback parameters.

No matter the original information belongs to which one of the several categories of the first type, the original information can be directly outputted as the supplemental information without interrupting the original information. As such, after the completion of the output of the reply information, a command for continue the playback is not needed to realize a program of continuing playback of the suspended original information, thereby saving the program and improving the user experience.

For example, the server or the electronic device is playing back a song or a storytelling before receiving the voice request. In this scenario, after obtaining the reply information, the song or storytelling originally outputted can be used as the supplemental information, the song or storytelling originally outputted can be not interrupted while responding to the voice request.

As another example, the server or the electronic device is playing back a song or storytelling before receiving the voice request. However, the first type includes news, and songs or storytelling that are not classified as news. After the reply information is obtained, the song or storytelling originally outputted cannot be used as the supplemental information.

In this scenario, only the reply information can be outputted, or the audio corresponding to the environment information can be determined as the supplemental information. The supplemental information can be outputted in association with the reply information, such that although the original output cannot be outputted without interrupting while the reply information is outputted, but the output of environmental information can be performed.

Consistent with the present disclosure, the electronic device can obtain the voice information. If the voice information is the voice request, the reply information in response to the voice request can be obtained, and the supplemental information can be obtained. The supplemental information refers to the information that needs to be outputted in association with the reply information. The reply information and the supplemental information can be transmitted, such that the associated supplemental information can be outputted when the reply information is outputted. When the voice request is received and the reply information in response to the voice request is obtained, the supplemental information outputted in association with the reply information can be obtained. Therefore, diversified feedback information can be realized. The problem that the feedback information in the conventional technologies is relatively simple and does not satisfy the diverse needs can be solved, and the user experience can be improved.

In the present disclosure, the embodiments are described in a gradual and progressive manner with the emphasis of each embodiment on an aspect different from other embodiments. For the same or similar parts between the various embodiments, reference may be made to each other. The disclosed apparatuses correspond to the disclosed methods, the detailed description is omitted and reference can be made to the description of the methods.

Those skilled in the art might appreciate that the exemplary elements and algorithm processes of the disclosed embodiments in the present disclosure can be implemented by an electronic hardware, a computer software, or a combination of both. To clearly illustrate an interchangeability of hardware and software, the elements and processes of the various exemplary embodiments have been generally described in terms of functionality. Whether the functions are implemented by the hardware or the software may depend on the specific application and design constraints of the technical solution. Those skilled in the art can use different methods for implementing the described functions for each particular application, but such implementation should not be considered to be beyond the scope of the present disclosure.

The exemplary elements and algorithm processes of the disclosed embodiments in the present disclosure can be implemented by the hardware, a software module executed by the processor, or a combination of both. The software module can be stored in a random access memory (RAM), a memory, a read only memory (ROM), an electrically programmable ROM, an electrically erasable programmable ROM, a register, a hard disk, a removable disk, a Compact Disc Read-Only Memory (CD-ROM), or any other form of storage medium known by those skilled in the art.

The foregoing description of the disclosed embodiments might enable a person skilled in the art to realize or use the present disclosure. Various modifications to the embodiments will be apparent to those skilled in the art. The general principles defined herein may be implemented in other embodiments without departing from the spirit or scope of the present disclosure. Accordingly, the present disclosure will not be limited to the embodiments shown herein, but is to meet the broadest scope consistent with the principles and novel features disclosed herein.

What is claimed is:

1. An output method, comprising:
    obtaining voice information;
    determining whether the voice information is a voice request;
    in response to the voice information being the voice request, obtaining reply information for replying to the voice request and supplemental information, the supplemental information being information that needs to be outputted in association with the reply information;
    transmitting the reply information and the supplemental information to an audio output device for outputting the reply information and the supplemental information using a first sound volume and a second sound volume parameter, respectively, such that a sound volume of an audio output of the reply information is higher than a sound volume of an audio output of the supplemental information; and
    in response to receiving a predetermined operation, outputting the reply information and the supplemental information using the second sound volume and the first sound volume parameter, respectively, such that the sound volume of the audio output of the supplemental information is higher than the sound volume of the audio output of the reply information, the predetermined operation including a gesture or a voice command.

2. The method according to claim 1, wherein obtaining the reply information for replying to the voice request and the supplemental information includes:
    obtaining the reply information for replying to the voice request after the voice request is parsed; and
    obtaining a first audio that matches environment information as the supplemental information.

3. The method according to claim 2, wherein obtaining the reply information for replying to the voice request after the voice request is parsed includes:
    obtaining the environment information for replying to the voice request as the reply information after the voice request is parsed.

4. The method according to claim 2, wherein:
    the voice information is obtained from an acquisition apparatus; and
    the environment information is associated with an environment where the acquisition apparatus is located.

5. The method according to claim 1, wherein obtaining the reply information for replying to the voice request and the supplemental information includes:
    obtaining the reply information in response to the voice request after the voice request is parsed; and
    obtaining newly-added information as at least part of the supplemental information.

6. The method according to claim 5, wherein obtaining the newly-added information as the at least part of the supplemental information includes:
    determining whether an important level of the newly-added information satisfies a predetermined level; and
    in response to the important level of the newly-added information satisfying the predetermined level, outputting the reply information and the supplemental information using a third parameter and a fourth parameter, respectively, such that the output of the reply information is prioritized over the output of the supplemental information.

7. The method according to claim 1, wherein obtaining the reply information for replying to the voice request and the supplemental information includes:

obtaining the reply information in response to the voice request after the voice request is parsed; and obtaining original information as at least part of the supplemental information, the original information being information outputted before the voice request is received.

8. The method according to claim 7, wherein obtaining the original information as the supplemental information includes:

in response to the original information being a first type, using the original information as the supplemental information, the first type being one of information without content, information from a predetermined application or a predetermined content source, and information having a number of playbacks that exceeds a threshold.

9. An electronic device comprising:

a processor configured to:
  obtain voice information;
  determine whether the voice information is a voice request;
  in response to the voice information being the voice request, obtain reply information for replying the voice request and supplemental information, and the supplemental information being information that needs to be outputted in association with the reply information; and
  transmit the reply information and the supplemental information; and an audio output circuit configured to:
  output the reply information and the supplemental information using a first sound volume and a second sound volume parameter, respectively, such that a sound volume of an audio output of the reply information is higher than a sound volume of an audio output of the supplemental information; and
  in response to receiving a predetermined operation, output the reply information and the supplemental information using the second sound volume and the first sound volume parameter, respectively, such that the sound volume of the audio output of the supplemental information is higher than the sound volume of the audio output of the reply information, the predetermined operation including a gesture or a voice command.

10. The electronic device according to claim 9, wherein the processor is further configured to:
  obtain the reply information for replying to the voice request after the voice request is parsed; and
  obtain a first audio that matches environment information as the supplemental information.

11. The electronic device according to claim 10, wherein the processor is further configured to:
  obtain the environment information for replying to the voice request as the reply information after the voice request is parsed.

12. The electronic device according to claim 10, wherein:
  the voice information is obtained from an acquisition apparatus; and
  the environment information is associated with an environment where the acquisition apparatus is located.

13. The electronic device according to claim 9, wherein the processor is further configured to:
  obtain the reply information in response to the voice request after the voice request is parsed; and
  obtain newly-added information as at least part of the supplemental information.

14. The electronic device according to claim 13, wherein:
  the processor is further configured to:
    determine whether an important level of the newly-added information satisfies a predetermined level; and
  the output circuit is further configured to:
    in response to the important level of the newly-added information satisfying the predetermined level, output the reply information and the supplemental information using a third parameter and a fourth parameter, respectively, such that the output of the reply information is prioritized over the output of the supplemental information.

* * * * *